June 21, 1960 R. P. WITT 2,941,409

VARIABLE SPEED POWER TRANSMISSION DEVICE

Filed Oct. 21, 1955

INVENTOR.

Richard P. Witt

United States Patent Office 2,941,409 Patented June 21, 1960

1

2,941,409

VARIABLE SPEED POWER TRANSMISSION DEVICE

Richard P. Witt, 13014 Grenoble Drive, Rockville, Md.

Filed Oct. 21, 1955, Ser. No. 541,935

3 Claims. (Cl. 74—217)

This invention relates to power transmitting devices in which frictional drives are utilized to permit the variation of the output speed in relation to the input speed.

It is a primary object of my invention to specify conditions relating to the form of frictional contacting members in a power transmission device so as to permit minimum wear, slippage, and power loss.

A more specific object will be to show how this may be achieved for variable speed power transmissions utilizing pulleys and a connecting belt.

Belt drives using cone pulleys are, of course, old and well-known. Such drives work very well under light loads, but are subject to rapid wear when applications of moderate or high power are encountered. The reasons for this are implicit in the geometry of the conventional cone pulley drive, which will be explained in some detail below in order to explain how the invention overcomes these difficulties. It will be obvious that in a conventional cone pulley, since its surface radius varies with its distance along the axis, a belt in contact with this surface is attempting to move at several different speeds simultaneously, while the contacting surface of the belt can match the pulley speed only along one line. At all points not on that line, there must be slipping between the belt and the pulley surface. Since the power which can be transmitted by such a drive, other things being equal, depends upon the friction between the contacting surfaces of the belt and pulleys, it will be obvious that more power can be transmitted if these surfaces are stationary with respect to one another than if they are in relative motion, since the static coefficient of friction is greater than the coefficient of sliding friction. It is also obvious that under heavy loads the sliding friction between the two surfaces will produce rapid surface wear. The first of these factors limits the force which can be transmitted by a given pulley drive, and the second affects the service life of the belt. It is a primary object of my invention to provide a pulley and belt configuration such that no relative slipping occurs between the contacting surfaces of the pulley and belt, thereby eliminating the above disadvantages. It is a secondary object to provide a variable speed belt drive in which the full contact area between belt and pulley is fully utilized to achieve maximum power transmission and maximum efficiency.

In a continuously variable speed friction drive, a power transfer will occur at positions of differing radii for different speed ratios. If power could be transmitted at only one radius, there would be no problem. However, an area of contact rather than a line of contact is necessary in a practical device and this leads to the result that several differing radii must be used simultaneously for power transfer, along the width of the belt. The several radii correspond to different velocities and will translate to different linear velocities on the belt surface. According to my invention, the belt is designed so as to permit various speeds to exist across its surface by virtue of a construction which provides for a variation in circumferential length corresponding to the several positions across its width. Furthermore, according to my invention the belt and pulley configurations are such that both the driving and driven pulleys match the belt design for all positions across the belt width as well as for all speed ratios.

2

The axial surface section of a conventional cone pulley is, of course, a straight line. Such a configuration will not meet the necessary requirements. The pulley contour which does meet the above requirements is that shape which is generated by revolving the curve known as a tractrix about the pulley axis. This curve is quite similar to an exponential curve in the region of low slope, and is defined by the condition that on a section of the pulley, given any two radii whose lengths to the axis of rotation, from the curve are of fixed proportion, that proportion being constant no matter what two radii are selected the distance between these radii on the surface of the curve is a constant. Both the driving and driven pulleys should be of this configuration as should also the belt at all points of contact with the pulleys. It is an object of my invention to provide such a configuration in a practical pulley drive which has the advantages of large power for a given transmission size, coupled with minimum wear and long life.

The specific nature of the invention, as well as other objects and advantages thereof, will clearly appear from a description of a preferred embodiment thereof as shown in the accompanying drawing, in which.

Figure 1:
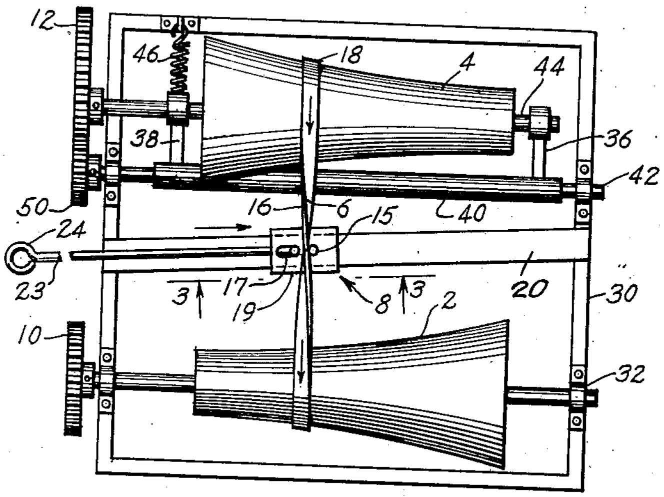
Figure 1 is a plan view of a variable speed pulley drive according to the invention.
Figure 2:
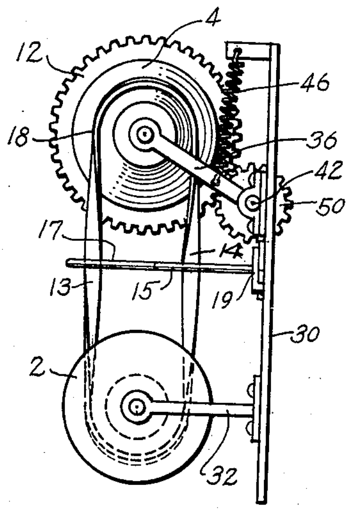
Figure 2 is a side elevation of Figure 1.

Referring to the figures, pulleys 2 and 4 are connected by belt 6 which can be shifted axially by means of belt shifter 8 to change the speed ratio between the pulleys. Power transmitted by any suitable means such as, for example, gear 10 attached to pulley 2 will be transmitted to gear 12 attached to pulley 4 at a speed and power ratio determined by the position of belt 6. It will be noted that the contour of pulleys 2 and 4 is not a straight line as is customary, but is a curve as explained in the preceding discussion. As best shown in Figures 1 and 2, belt 6 is not crossed between the pulleys but is flipped over so that the belt surface which is inside when it is contacting pulley 2 is on the outside when it reaches pulley 4. With this arrangement, both pulleys will rotate in the same direction. It is obvious that if it is desired to reverse the direction of rotation of one pulley with respect to the other, the belt may be crossed in the usual fashion. At some point between the two pulleys the belt turns at right angles to itself as shown at 13 and 14 in Figure 2 in which region both sides of the belt loop lie substantially in a common plane. Belt shifter 8 in this region therefore contacts the relatively flat side of the belt rather than its edge. In order for the belt shown to accommodate itself to the pulleys, the belt cannot be of the usual cylindrical conformation but, if laid out on a flat surface, will be seen to be either a section of a funnel type surface or equivalent to a large flexible washer. Ideally the belt would be formed by "skinning" a thin band off from around the large end of a large cone of the type used for the pulleys. Because of inherent flexibility in most belting materials, the belt will adapt to minor deviations from theoretical construction principles and this may be utilized to simplify the construction somewhat.

The curve of revolution of the pulley and belt contours may be understood as follows: the necessarily fixed ratio of belt circumferences must be mated by the corresponding pulley radii at all points of contact as the belt is shifted to change speed ratio. To accomplish this I require that for any small length along the curve in the direction of greater radius an increase in the radius should exist which is proportional to the length along the curve and the initial value of the radius. By causing the factor of proportionality for the pulley curve and the belt curve to be equal, proper mating will be obtained when they are used together.

Figure 4:
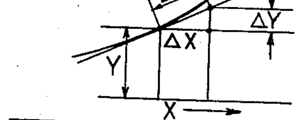
Figure 4 is a generalized graph of pulley contour.

The above criteria state that the ordinates of such a curve, as shown in Figure 4, should have the relationship that $\Delta Y=K(\Delta Z)Y$ where $\Delta Z$ is the length of a small section tangent to the curve at ordinate Y, $\Delta Y$ represents the increase in ordinate height, and $\Delta X$ represents the distance along the pulley axis. Thus:

$$\Delta Z=\sqrt{\Delta X^2+\Delta Y^2}$$

but $$\Delta Y=YK\Delta Z$$

thus $$\Delta X=\frac{\sqrt{1-Y^2K^2}}{YK}Y$$

In the limit as $\Delta Y$ approaches zero the length of $\Delta Z$ will approach the length of the curved section and $\Delta Y$ will represent the true increase of ordinate to the curve. In this condition we may rewrite thus $$dX=\frac{\sqrt{1-Y^2K^2}}{YK}dY$$

In the above equation K represents a design proportionality constant for the contour. Therefore:

$$X=\int\frac{1}{K}\frac{\sqrt{1-Y^2K^2}}{Y}dY$$

$$=\frac{1}{K}\sqrt{1-Y^2K^2}-\ln\left[\frac{1+\sqrt{1-Y^2K^2}}{KY}\right]+C$$

where C is an integration constant.

This equation provides slip-free mating of a belt with given width and edge circumferences to all positions on the pulley.

Although the drawing shows the pulleys with a certain spacing, it will be understood that in practice, the span of belt between the pulleys should be adjusted to a distance which provides a reasonably uniform stress distribution across the belt width, since if the difference of edge lengths of the belt between pulleys is greater than is needed to provide for the twist of the belt, there will be a resulting slackness of one edge which prevents that edge from contributing fully to power transmission. Therefore, the overall belt length (i.e., pulley spacing) should be chosen such as to bring the pulley axes to a nominal position which permits of a "tight" twist of the belt.

Belt shifter 8 comprises two belt moving rods 15 and 17 rigidly fixed to block 19 which is mounted to slide on the edges of guide bar 20. An actuating rod 23 is fixed to block 19 and is provided with a suitable handle 24 whereby the position of the belt shifter on its guidebar 20 may be adjusted. For practical purposes, it is desirable that the belt shifter contact the belt at or very near its cross-over point. This cross-over point is determined not only by the belt contour, but also by the relative pulley diameters at any given point. It will be apparent that guidebar 20 can be so shaped as to guide the belt along the theoretically correct path, but in practice it is a sufficiently close approximation to make the bar a straight line slightly slanted as shown with respect to the pulley axis. Rods 15 and 17 may be made of equal length if desired, so that each rod engages both sides of the belt loop simultaneously when it is shifting the belt. However, a refinement of the belt shifting mechanism consists in moving the belt in such a manner as to tend to increase belt shift tension while shifting, thus protecting against the possibility of a sudden slackening of the belt and temporary power loss. To accomplish this, instead of forcing both belt suspensions as described above, only the one which will be forced to a higher or larger-diameter position is forced. For example, in Figure 1, with the belt moving in the direction indicated by the arrow, the upper or visible side of the belt loop should be pressed by rod 17 when moving to the right, and the lower side (not visible) by rod 15 when shifting to the left. In this way, the belt always tends to ride up on the larger diameter of the pulley during shifting, which will aid the maintenance of tension. In order to accomplish this, rods 15 and 17 are formed as shown, so that each rod will be effective in one direction upon one side of the belt loop only. If the orientation of the rod assembly is correlated with the direction of rotation of the belt, the above described operation will occur. Since the belt, if properly designed as shown above, will normally have only little preference for one axial position as compared with any other axial position, it will normally be very stable and tend to remain where put. Therefore, a light touch by either of the belt shifting rods 15 or 17, since it tends to change the direction of the belt as it approaches the pulley, will cause the belt itself to seek a new position in which it is again stable. There is therefore very little wear between the belt and belt shifting members, so that it is satisfactory to make the latter of any suitable hard, polished material. However, if it is desired to still further improve the operation, the belt shifting rods may obviously be provided with rotatable high-low members so that instead of sliding friction between the belt surface and rods, rotational friction taken by a bearing can be substituted.

The use of the non-linear pulley contour above described results in one characteristic which must be provided for: namely, with a fixed distance between pulley axes a belt which is tight for one axial position will necessarily be slack for other axial positions. It therefore becomes necessary to provide means for taking up this slack as the belt is shifted. Figure 1 shows one manner of accomplishing this. Pulley 2 is fixed to frame 30 by means of rigid pedestal 32. Pulley 4, however, is mounted on movable arms 36 and 38 which are supported by a common sleeve 40 rotatably mounted on shaft 42 supported on frame 30. Thus, not only does pulley 4 rotate about its own shaft 44 but the pulley and its shaft together as a unit can oscillate for a limited angular distance about shaft 42 which serves to vary the distance between pulleys 2 and 4. Tension spring 46 therefore serves to provide pulley tension at all axial positions of belt 6 despite the slight change in distance between pulleys 2 and 4 as the belt is shifted axially along the pulleys. Gear 12 which is fixed to pulley 4 meshes with gear 50, which is mounted on shaft 42, at all angular positions of the arms 36 and 38 so that the power may be taken from gear 50 at all times when the pulleys are rotating.

Figure 5:
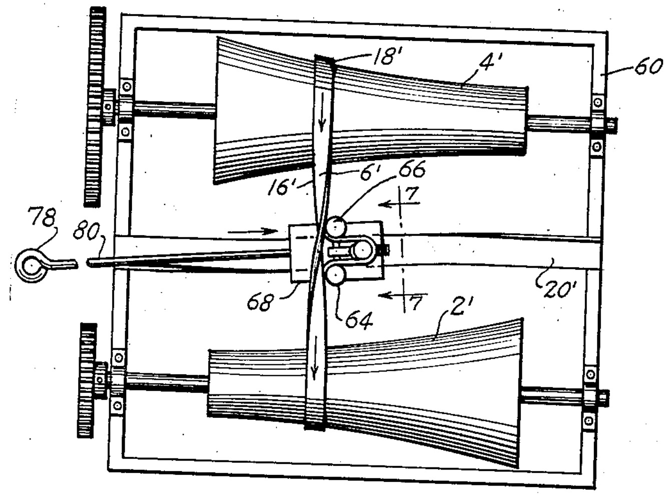
Figure 5 is a plan view of a modified form of the invention.
Figure 6:
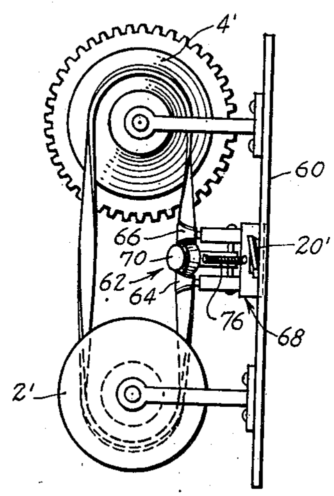
Figure 6 is a side elevation of Figure 5.
Figures 3, 7:
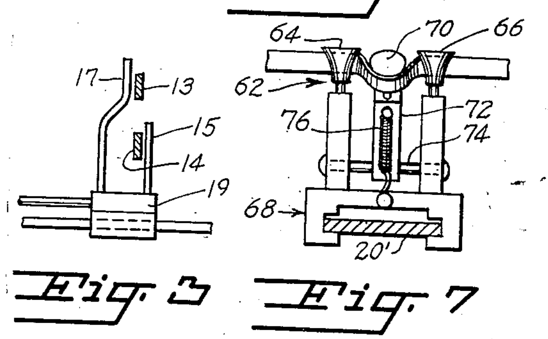
Figure 3 is a detail view of the belt shifter taken on line 3—3 of Figure 1.
Figure 7 is a detail view of the belt shifter taken on line 7—7 of Figure 5.

Figures 5–7 show an alternative arrangement for taking up the slack as the belt is shifted along the pulleys. In this modification the pulleys 2' and 4' are both fixed to the frame, and therefore maintain a constant distance between their axes. At the point of cross-over between the pulleys, where the belt is substantially perpendicular to the plane of frame 60, I provide a combined belt shifter and slack take-up assembly 62 which works only on the lower part of the belt loop, that is, the part nearer the plane of frame 60 as best shown in Figure 6. The take-up device as seen in Figure 7 comprises two idler pulleys 64 and 66 mounted on an inverted U-shaped bracket 68 and a third idler pulley 70 mounted on a post 72 which is pivoted at 74 between the legs of U-shaped bracket 68. Compression spring 76 is provided to urge pulley 70 away from pulleys 64 and 66 so as to at all times take up the slack in belt 6'. The idler pulleys are all provided with a contour of the same configuration as main pulleys 2' and 4' so that they will mate accurately with the belt surface without slipping. This is necessary since in this modification the same tension exists between the belt and the idler pulleys as between the belt and the main pulleys, and it is therefore equally essential to avoid wear and friction at the idler pulley surfaces. It will be remembered that the belt is arcuate in shape, and the pivotal arrangement of the pulley mountings is such as to permit the belt section between the fixed idler pulleys and the movable idler pulleys to assume its natural arcuate shape, since this condition must be complied with to permit proper non-slip mating between the surface of idler pulley 70 and the engaged portion of belt 6'.

Another condition essential for accurate mating of the idlers with the belt is that the axes of pulleys 64 and 66 must be at all times perpendicular to the line of the engaged portion of the belt between the pulleys. It will be obvious that when the belt is shifted to either end of the pulleys, this belt line, in passing from the large pulley section to the small pulley section, will be at an angle to the plane of the frame 60; while at the mid-point of the pulleys, where the two pulley diameters are equal, the belt line will be parallel to the plane of frame 60. It is therefore necessary that the assembly 62 adjust itself angularly as it is moved along the line between the pulleys to comply with this condition. The entire assembly 62 is slidably mounted on slide bar 20'. The plane of slide bar 20', instead of being kept parallel to the plane of the frame like slide bar 20 in the previous modification, is now provided with a twist such that as assembly 62 slides along the bar, it remains at the correct angle with respect to the line of the engaged belt portion. In addition to this angular deviation, the distance of the point of engagement between the idlers and the belt to the plane of frame 60 also changes slightly as the belt is shifted. This can either be compensated for by making the idler pulleys sufficiently long so that the belt can ride up and down them to accommodate itself to this change in distance, or else slide bar 20 can be given a bend with respect to the plane of frame 60, in addition to its twist, to provide the necessary compensation. A suitable handle 78 and rod 80 are again provided for manual shifting of the assembly 62.

It will thus be apparent that the construction shown complies with the necessary conditions and provides the full, slip-free contact at all times between the belt and the pulleys which is necessary for maximum transmission of power with minimum belt wear.

It will be apparent that the embodiments shown are only exemplary and that various modifications can be made in construction and arrangement within the scope of my invention as defined in the appended claims.

I claim:

1. A variable speed belt drive comprising at least two spaced oppositely tapered pulleys arranged with their axes parallel, the surface contour of each said pulley being generated by a curved line revolved about the pulley axis, the nature of the curved line being such that for a given length along the curve the radii at the extremities of such length are of a fixed proportion anywhere along the pulley, a belt coupling said pulleys and being shaped to conform to said curved pulley surfaces, said belt being flipped so that one side of said belt contacts only one of said pulleys and the other side of said belt contacts only the other of said pulleys, means for shifting said belt axially along said pulleys, and means comprising relatively movable mounting means for said pulleys for varying the distance between said pulleys while maintaining parallelism thereof and tension means tending to separate said pulleys against the restraint of said belt.

2. The invention according to claim 1, said mounting means comprising bearings for one of said pulleys mounted on a pivotal member, second bearing means for said pivotal member permitting at least limited arcuate movement of said member about said second bearing means, a rotary power device fixed to said one pulley on the axis thereof and a second rotary power device mounted for rotation about the axis of said second bearing means, whereby the distance between said rotary power devices remains constant during said limited arcuate movement, and means coupling said rotary devices.

3. The invention according to claim 2, said rotary devices being gear wheels.

References Cited in the file of this patent

UNITED STATES PATENTS

| | | |
|---|---|---|
| 307,450 | Finlay | Nov. 4, 1884 |
| 540,088 | Chandler | May 28, 1895 |
| 704,203 | Moorhouse | July 8, 1902 |
| 912,559 | Gmur | Feb. 16, 1909 |
| 950,010 | Slonecker | Feb. 22, 1910 |
| 2,300,285 | Gwaltney | Oct. 27, 1942 |

FOREIGN PATENTS

| | | |
|---|---|---|
| 66,427 | Sweden | Nov. 27, 1928 |